Sept. 20, 1932.  W. R. WALKER  1,878,558
WELDING APPARATUS
Filed March 13, 1929  4 Sheets-Sheet 1

INVENTOR
Warren R. Walker
BY
HIS ATTORNEY

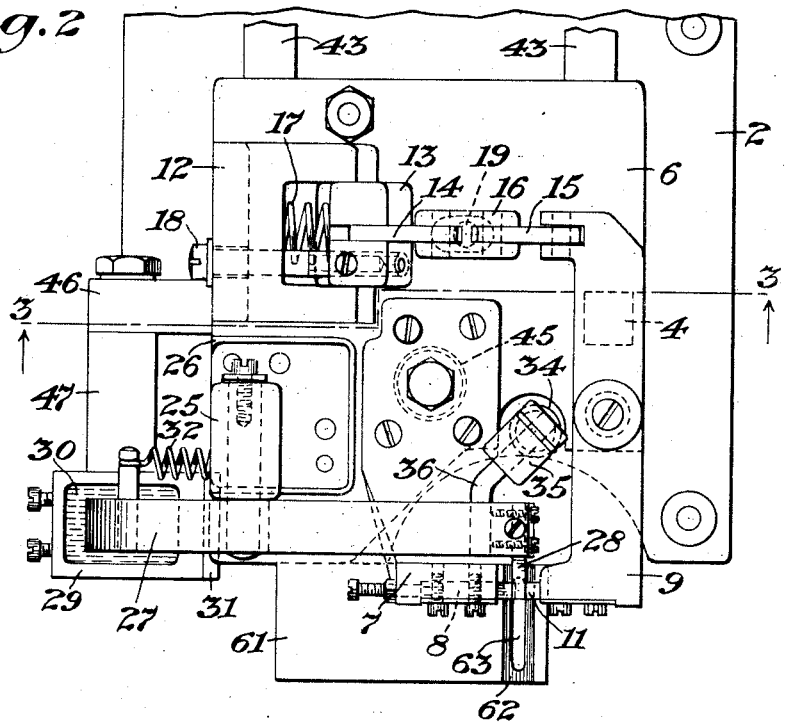

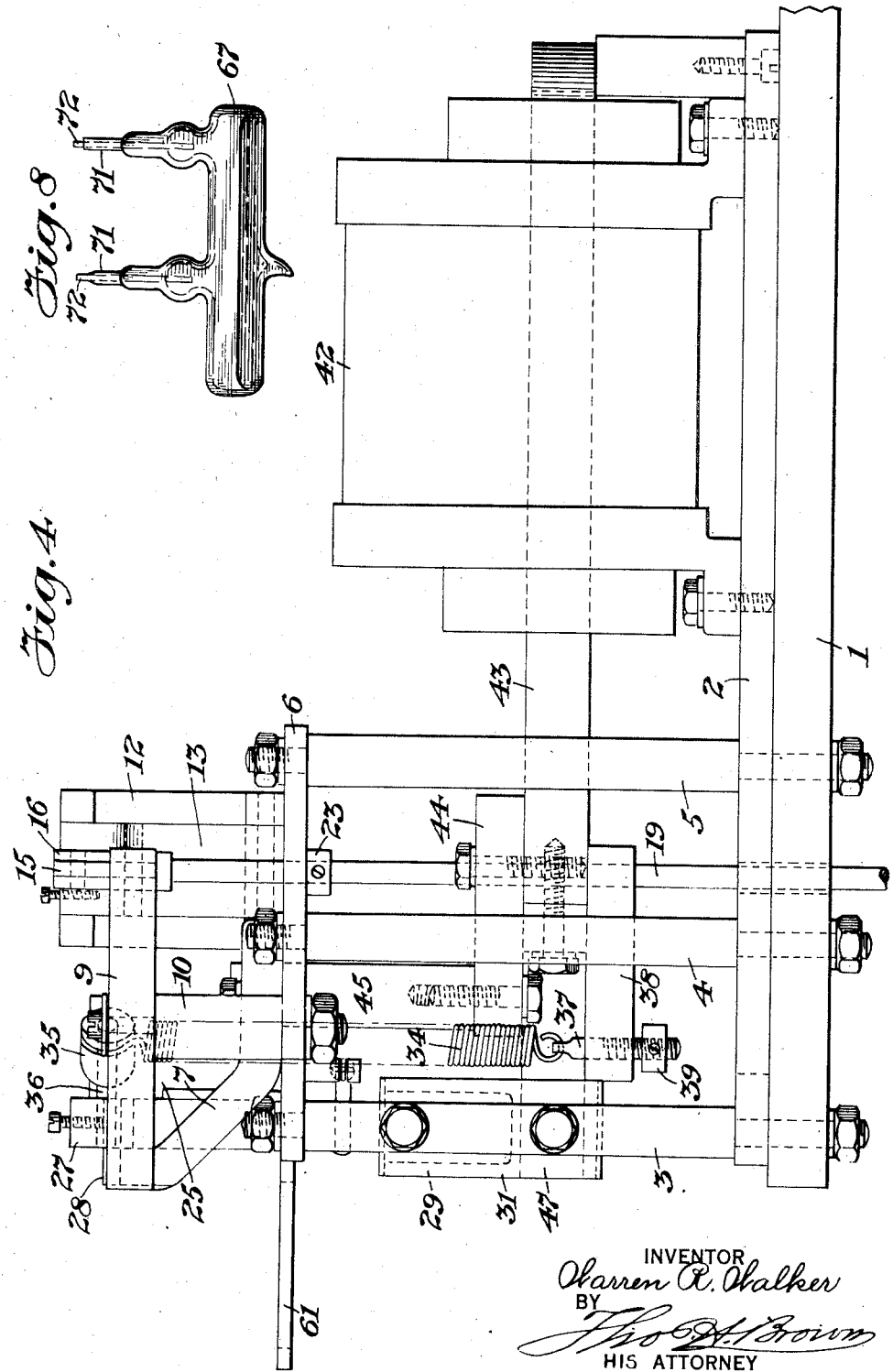

Sept. 20, 1932.    W. R. WALKER    1,878,558
WELDING APPARATUS
Filed March 13, 1929    4 Sheets-Sheet 4
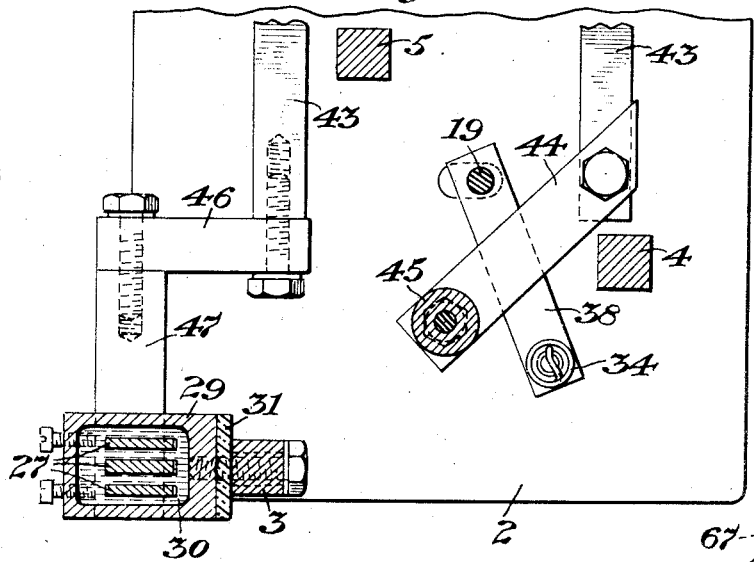
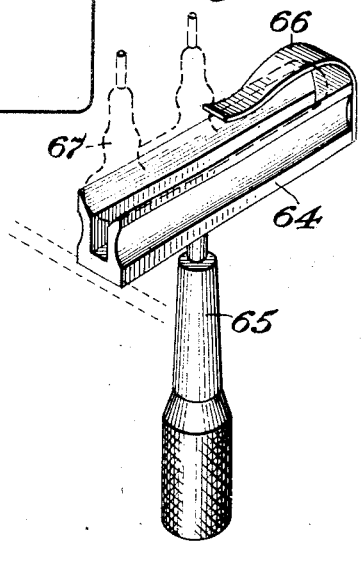
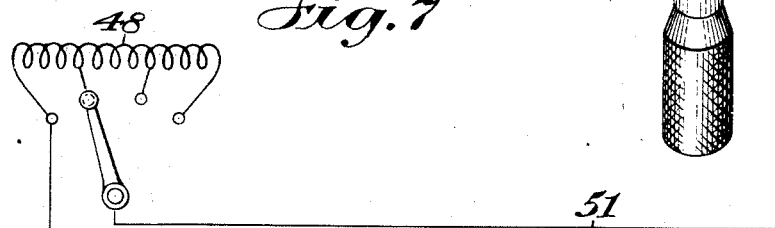
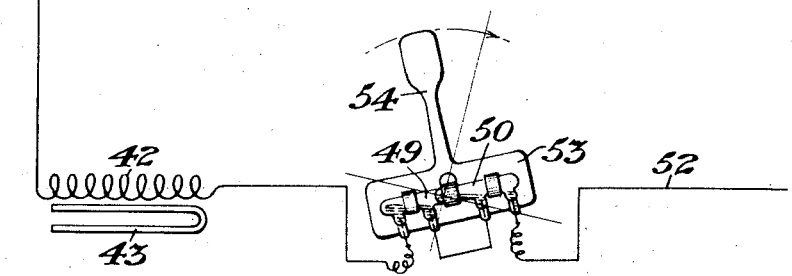
INVENTOR
Warren R. Walker
BY
HIS ATTORNEY Patented Sept. 20, 1932

1,878,558

UNITED STATES PATENT OFFICE

WARREN R. WALKER, OF SHORT HILLS, NEW JERSEY, ASSIGNOR TO GENERAL ELECTRIC VAPOR LAMP COMPANY, OF HOBOKEN, NEW JERSEY, A CORPORATION OF NEW JERSEY

WELDING APPARATUS

Application filed March 13, 1929. Serial No. 346,574.

The present invention relates to electric welding apparatus. A particular object of the invention is to provide apparatus for welding purposes which will exert a heavy pressure upon a part being welded with little effort on the part of the operator. Another object of the invention is to make this pressure independent of the pressure applied by the operator. A further object is to prevent application of excess pressure to the part. Various other objects and advantages of the invention will be obvious from the following detailed description of one form of apparatus embodying my invention, or from the accompanying drawings.

The invention consists in certain new and novel arrangements of parts as hereinafter set forth and claimed.

In the manufacture of electrical devices having a vitreous envelope and metal inleads, such as mercury switches, it has been proposed to weld a metal sleeve about the exterior part of the inlead. Because of the proximity of the vitreous material only the outer end of the sheath is welded to the inlead, and the heat must be kept to a minimum. The method employed has been to slip the sheath in place with a small amount of the inlead protruding, after which the sheath was gripped in the jaws forming one electrode of a butt welding machine, a copper bar which is connected to the other electrode then being applied to the exposed end of the inlead. It has been found that considerable pressure must be exerted upon the jaws gripping the sheath in order to avoid resistance heating between the jaws and the sheath and between the sheath and the inlead. If sufficient leverage is supplied in the ordinary welding apparatus so that the operator can produce the required pressure without undue effort the new problem is introduced that there is danger of deforming the thin sheath if the operator applies a heavier pressure than usual. By the present invention applicant has provided welding apparatus in which these difficulties are all eliminated, means being provided whereby a definite pressure is always exerted upon the article being welded. The invention, while particularly useful in the welding of such articles as switch inleads, is also useful in the arts generally, and is not intended to be limited to the use described above.

For purposes of illustration several views of an apparatus embodying my invention are shown in the accompanying drawings, in which Fig. 1 is a front elevation of an apparatus for welding metal sleeves onto inleads of mercury switches, Fig. 2 is a plan view of the apparatus of Fig. 1, Fig. 3 is a sectional view taken at the line 3—3 of Fig. 2,

Fig. 4 is a side elevation of the apparatus of Fig. 1,

Fig. 5 is a sectional view taken at the line 5—5 of Fig. 1,

Fig. 6 is a view in perspective of the work holder.

Fig. 7 is a schematic diagram of the electrical connections, and

Fig. 8 is a view of a mercury switch having sleeves on its inleads, one of which has already been welded thereto by the apparatus of my invention.

Figure 1:
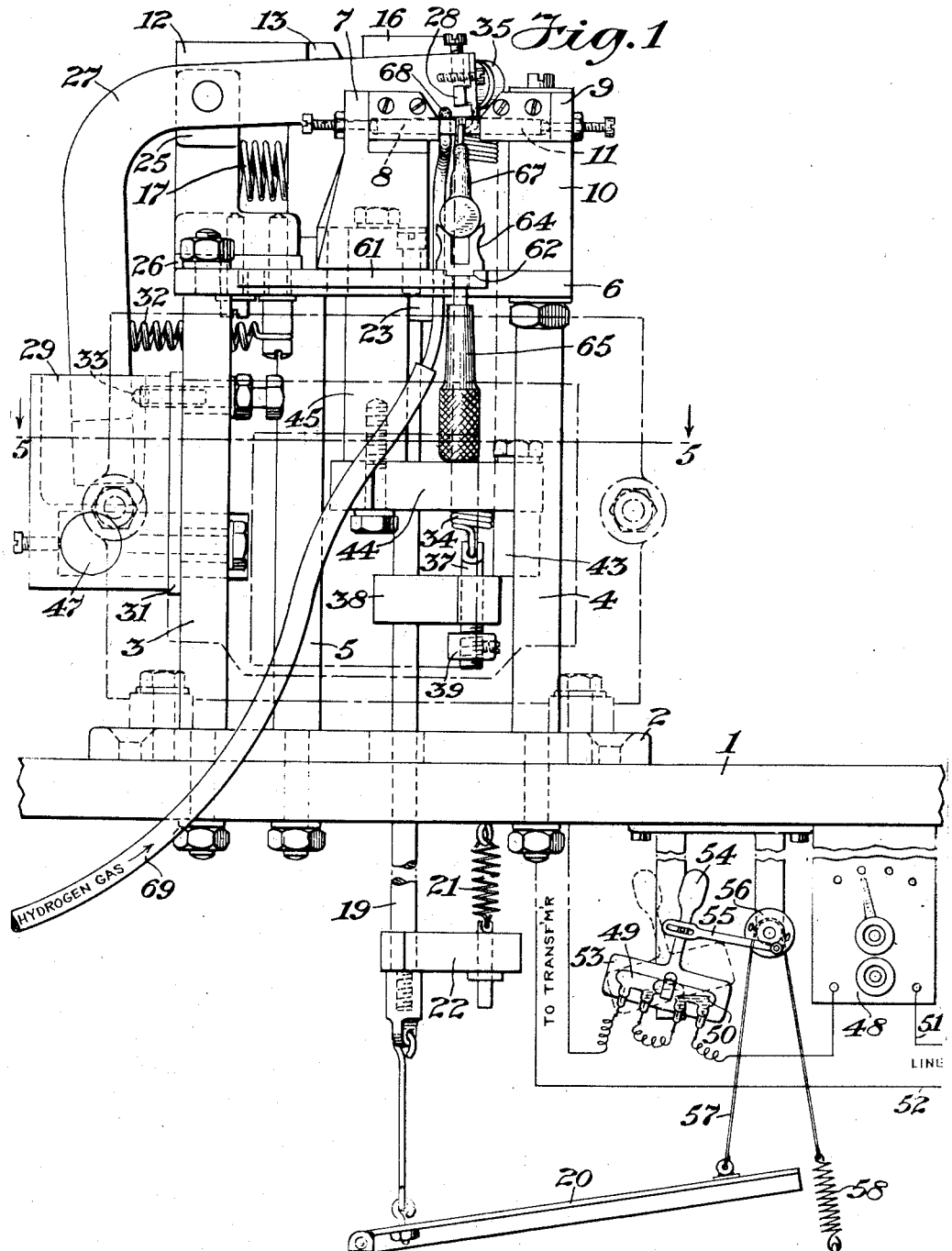

In the drawings a base 2 is mounted on a table 1. Three vertical posts 3, 4 and 5 are attached at their lower ends to the base 2, and at their upper ends support a plate 6. Toward the front and center of the plate 6 there is attached a heavy copper bar 7, the front end of which is bent upwardly. A smaller copper bar 8 is adjustably mounted in the front end of the bar 7, and serves as the fixed part of a clamping device which forms one electrode of the welding circuit. A heavy bar 9 is pivotally mounted near its mid-point on the post 10 which is in turn carried by the plate 6. At its front end said bar 9 has adjustably mounted thereon a small bar 11 which registers with the bar 8. Opposite the other end of the bar 9 a U-shaped block 12 is mounted on the plate 6 with the open end of the U toward the bar 9. The lower leg of the member 12 is slotted to receive one end of a block 13, which is pivotally mounted therein, the upper leg of the member 12 being recessed to allow free movement of the block 13 on its pivot. The upper end of the block 13 is likewise slotted to receive one end of a link 14 which is pivotally mounted therein. A similar link 15 is connected to the adjacent end of the bar 9, the free ends of the links 14 and 15 being pivotally connected to the block 16 to form a toggle. A compression spring 17 is mounted between the member 12 and the block 13 and serves to limit the pressure which is exerted by the links 14 and 15 on bar 9. A bolt 18 passing loosely through the member 12 and engaging the block 13 limits the motion of said block. A rod 19 which passes through suitable slots in the plate 6, base 2 and table 1 engages the block 16 at one end, and is attached to a pedal 20 at the other end thereof. A tension spring 21 connected at one end to the table 1 and at the other end to an arm 22 carried by the rod 19 normally maintains the rod 19 at its upper limit of travel with the collar 23 against the lower side of the plate 6, but when the pedal 20 is depressed the links 14 and 15 are straightened out against the pressure of the spring 17, forcing the bar 9 to pivot to bring the bar 11 into gripping relation with bar 8. With this construction an extremely heavy pressure may be readily exerted on an article held between the jaw bars 8 and 11 with little effort on the part of the operator. At the same time, however, a safe maximum pressure cannot be exceeded, regardless of the pressure exerted upon the pedal 20.

Toward the front left corner of the plate 6 there is mounted a support 25, said support being insulated from said plate by a fiber sheet 26 and suitable bushings and washers on the attaching screws. Pivotally mounted on said support 25 is a heavy L-shaped copper bar 27, one end thereof being adjacent to the jaw bars 8 and 11. A small copper bar 28 extends forwardly from the bar 27 and is adapted to contact with the end of a wire held vertically between the jaws 8 and 11, thus forming the other electrode of the welding apparatus. The other end of the bar 27 extends downwardly into a cup 29 which is filled with mercury 30, the ends of the bar 27 being slotted to give a greater contact area with the mercury. The cup 29 is supported by the post 3, but is insulated therefrom by the fiber sheet 31 and by suitable bushings and washers on the attaching screws. A tension spring 32 is attached to a stud on the bar 27 at one end and to an insulated stud on the lower side of the plate 6 and tends to maintain the arm 27 against a stop 33 formed by a projection of one of the screws used to support the cup 29, thus normally maintaining the electrode 28 in an elevated position. A tension spring 34 at one end makes connection through an insulating sleeve 35 with an arm 36 carried by the bar 27 at a point between the pivot and the end carrying the electrode 28, while the other end of said spring 34 is attached to a rod 37 which loosely passes through the arm 38 carried by the rod 19. A collar 39 on the rod 37 serves to produce simultaneous movement of the rods 19 and 37 after the rod 19 has moved downwardly a predetermined distance. As a result the jaws 8 and 11 are caused to firmly grip an article held thereby before the electrode 28 is applied to the end thereof. The spring 34 is strong enough to overcome the spring 32, but allows such variations in the operating position of the electrode 28 as are required to make good contact with an article held by the jaws 8 and 11.

On the base 2 to the rear of apparatus previously described is mounted a transformer 42 having a secondary 43 consisting of a single turn formed by a heavy U-shaped copper bar. One side of the secondary 43 is connected through the copper bar 44 and the copper rod 45 to the copper bar 7, provision thus being made to carry currents of large amperage to an article held by the jaws 8 and 11. The other side of the secondary 43 is connected through the copper bar 46 to the copper rod 47, which passes through the lower part of the cup 29, the circuit being completed through the mercury 30 and bar 27 to the electrode 28. The primary of the transformer 42 is in series with a variable inductance 48 and the mercury switches 49 and 50, being connected to a source of alternating current of suitable potential by the leads 51 and 52. The switches 49 and 50 are mounted below on a pivoted block 53 in such position that when one switch is opening the other is closing. A weighted arm 54 which extends upwardly from the block 53 has a pin thereon which engages with a slot in a link 55. The other end of said link 55 is connected to an eccentric pin on the pulley 56. A cord 57 which is connected to the pedal 20 at one end and to a spring 58 attached to the floor at the other end operates a ratchet arrangement by which the pulley 56 is rotated through an angle of 180 degrees each time the pedal 20 is depressed, but is not rotated when the pedal 20 is released. As the pulley 56 rotates the link 55 moves the arm 54 from one position of rest to a position just beyond the vertical, whereupon the weight of the arm 54 carries the arm and the associated switches to the other position of rest. During this movement of the switches 49 and 50 the circuit is made through one of said switches an instant before the circuit is broken through the other switch, allowing a momentary passage of current through the transformer 42. The parts are so designed that this current flow does not take place until the jaws 8 and 11 have firmly gripped the work and the electrode 28 has made contact therewith, so that the weld can be produced by the current induced in the secondary 43. The interval during which the current persists can be easily varied by changing the relative angular positions of the switches 49 and 50.

At the front of the plate 6 there is an extension 61 which has a groove 62 therein directly below the jaws 8 and 11, in which there is a central slot 63. A work holder 64 is adapted to slide in the groove 62, the shank of the handle 65 passing through the slot 63. A spring clip 66 is adapted to grip an article such as the switch body 67 to firmly hold it in the work holder 64. The work holder 64 is designed to support the switch body 67 at such a level that the inleads thereof extend to a point just above the top of the jaws 8 and 11.

To prevent oxidation of the article being welded the jaws 8 and 11 are surrounded by a reducing atmosphere. This is produced most conveniently by causing hydrogen flames from a series of jets 68 to surround the parts which are heated during the welding process. Hydrogen is supplied to the jets 68 through the tube 69 from a convenient source.

In the use and operation of the device to weld a sleeve upon an inlead of a device such as the mercury switch 67, the metal sheaths 71 of nickel or the like are placed on the inleads 72 which are of tungsten or other similar metal with the end of the inleads 72 extending a short distance beyond the sheaths 71, as shown on the right hand inlead of Fig. 8. The switch 67 is then inserted in the work holder 64 which is then moved to cause one inlead 72 to register with the jaw 8, with the sheath 71 extending slightly above the top of said jaw. Pedal 20 is then depressed, which first causes the jaws 11 to clamp the sheath 71 and inlead 72 firmly against the electrode jaw 8, sufficient pressure being exerted to eliminate contact resistance between the jaw and the sheath, and between the sheath and the inlead. Further movement of the pedal 20 causes the electrode 28 to make contact with the end of the inlead 72, and then a circuit is completed momentarily through the switches 49 and 50, causing a heavy current to flow through the sheath 71 and the inlead 72. Due to the small cross section of the exposed end of the inlead 72 most of the heating is confined to this point, the inlead 72 being heated sufficiently to melt the adjacent edge of the sheath 71, causing the metal of the sheath to flow onto the inlead 72, with a resulting perfect weld such as illustrated on the left hand lead of Fig. 8. With the application of the heat so limited in time, and so localized in area the desired weld is completed without appreciable heating of the vitreous envelope 67 onto which the inleads 72 are sealed, thus avoiding any temperature strains therein. The work holder 64 is then rotated or otherwise moved to bring the second inlead 72 into proper relation with the jaw 8, after which the operation is repeated, the switch 67 then being removed from the work holder 64 and another switch 67 inserted therein, the cycle being repeated as before.

While I have illustrated my invention as applied to welding sleeves to switch inleads it is obvious that it is suitable to perform other welding operations where similar problems must be met. It is also to be understood that various changes, substitutions and omissions within the scope of the appended claims may be made in the structure or mode of operation of my new apparatus without departing from the spirit of my invention.

I claim:

1. In combination in a welding machine, electrodes, means to apply pressure to clamp an article to one electrode, means to limit said pressure, and means to apply another electrode to another part of said article.

2. In combination in a welding machine, electrodes, means to apply pressure to clamp an article to one electrode, means to limit said pressure, means to apply another electrode to another part of said article, and means interlocked with said last mentioned means to pass a welding current of definite time duration through said article.

3. In combination in a welding machine, electrodes, means to apply pressure to clamp an article to one electrode, said means including a toggle, one end of said toggle being supported by a spring, whereby the pressure exerted by said toggle is limited to a safe maximum value, and means to apply another electrode to another part of said article.

4. In combination, in a welding machine, electrodes, means to apply pressure to clamp an article to one electrode, said means including a toggle, one end of said toggle being supported by a spring whereby the pressure exerted by said toggle is limited to a safe maximum value, means to apply another electrode to another part of said article, and means interlocked with said last mentioned means to pass a welding current of definite time duration through said article.

5. In combination, in a welding machine, electrodes, means to apply pressure to clamp an article to one electrode, means cooperating with first mentioned means to limit said pressure, and means to apply another electrode to another part of said article.

6. In combination in a welding machine, electrodes, means to apply pressure to clamp an article to one electrode, yielding means to limit said pressure, and means to apply another electrode to another part of said article.

7. In combination in a welding machine, electrodes, means to apply pressure to clamp an article to one electrode, means to limit said pressure to a substantially fixed value despite appreciable variations in the thickness of said article and means to apply another electrode to another part of said article.

8. In combination, in a welding machine, electrodes, means to apply pressure to clamp an article to one electrode, means to limit said pressure, means to apply another electrode to another part of said article, means interlocked with said last mentioned means to pass a welding current of definite time duration through said article, and means to alter the duration of said current at will.

9. In combination in welding apparatus, electrodes, means to apply pressure to clamp an article to one electrode, means to limit said pressure, and means to apply another electrode to another part of said article after said article has been clamped to said first mentioned electrode.

Signed at Hoboken in the county of Hudson and State of New Jersey this 12th day of March A. D. 1929.

WARREN R. WALKER.